Figures 1, 2:
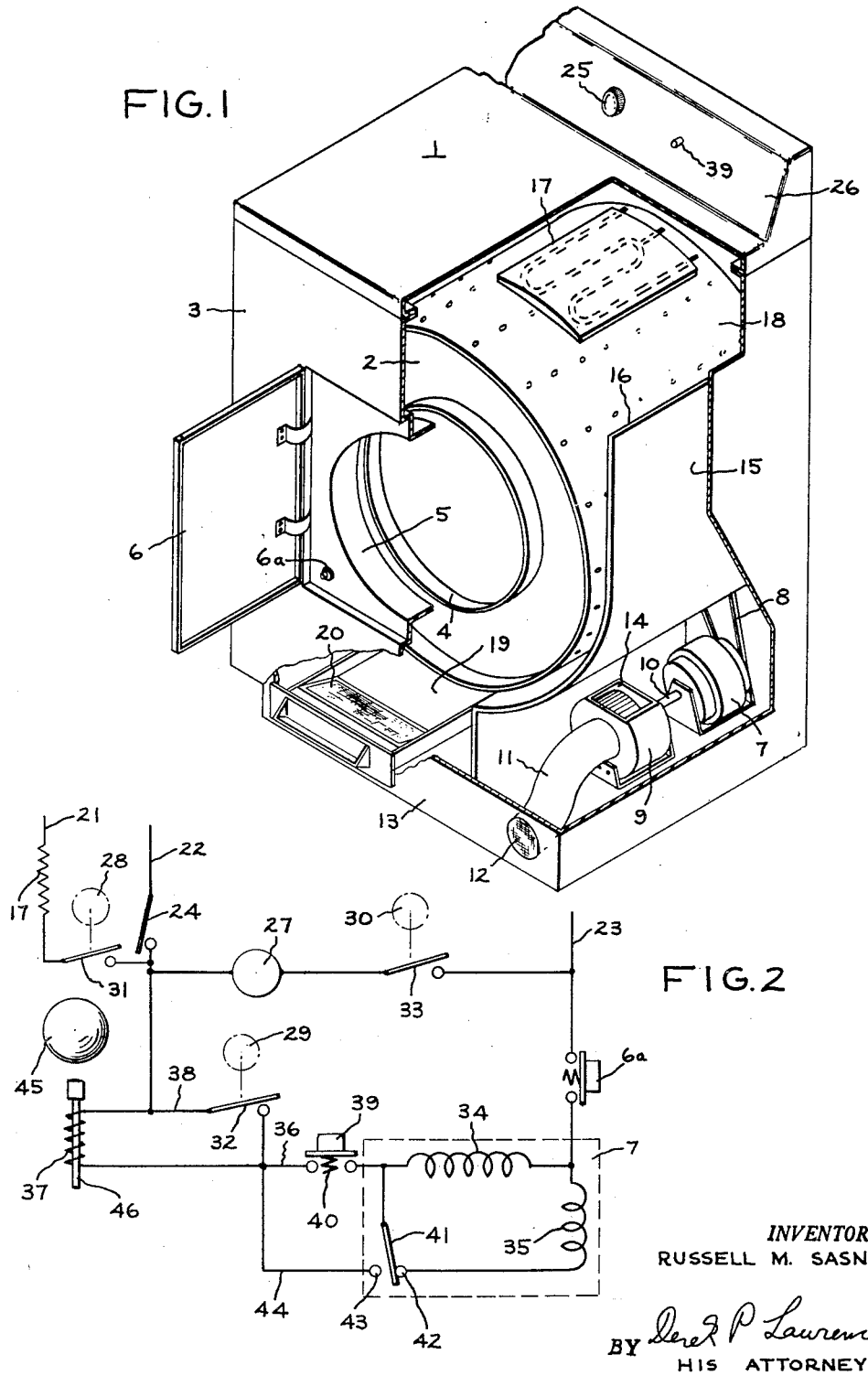

Aug. 28, 1962 R. M. SASNETT 3,050,864
SIGNALLING DEVICE FOR APPLIANCES AND THE LIKE
Filed March 14, 1960

INVENTOR.
RUSSELL M. SASNETT
BY Derek P Lawrence
HIS ATTORNEY

United States Patent Office 3,050,864
Patented Aug. 28, 1962

3,050,864
SIGNALLING DEVICE FOR APPLIANCES
AND THE LIKE
Russell M. Sasnett, Louisville, Ky., assignor to General
Electric Company, a corporation of New York
Filed Mar. 14, 1960, Ser. No. 14,679
1 Claim. (Cl. 34—45)

This invention relates to a motor and control device circuit, and more particularly to such a circuit appropriate for use in an appliance or the like for effecting a function as the result of energization of the control device at the end of an operating cycle of the appliance.

It is an object of this invention to provide a motor and control device circuit in which operation of a single controlling switch will have the result of causing both a brief energization of the control device and the subsequent de-energization of the motor.

More particularly it is an object of my invention to achieve such a circuit in which the control device is of the type appropriate for providing an audible signal to indicate to an operator the end of a cycle.

It is a particular object of my invention to provide such a control system for effecting an audible signal in a clothes drying machine to indicate the end of a cycle so that the clothes may be removed from the machine very shortly after the end of the cycle.

In carrying out my invention, I provide, in combination, a low-impedance electric motor which includes a speed-responsive switch mechanism, and a high-impedance electric control device effective to complete a function when it is energized for a brief period of time. Across the control device I connect a short circuit, and incorporate appropriate control means for opening the short circuit. The starting circuit for the motor includes a manually operable switch which is in series with the motor and also with both the control device and the short circuit. The manually operable switch is biased to open position, conventionally by a spring actuating it away from the closed position.

In order to provide for continuous running of the motor for a desired period, I provide a bypass circuit around the manually operable switch, the bypass circuit including the speed-responsive mechanism in such a way that when the motor operates above a predetermined speed the bypass circuit is closed and when the speed drops substantially below the predetermined speed the bypass circuit is opened. This arrangement causes the motor to operate effectively as long as the short circuit across the control device is closed. When, however, the end of an operation is reached and the short circuit across the control device is opened, the high-impedance control device then becomes energized in series with the motor and performs its desired function. The series relationship of the motor and the high-impedance control device removes substantially all voltage from across the motor and as a result the motor is de-energized and slows down to open the bypass circuit, thereby de-energizing the entire arrangement.

The subject matter which I regard as my invention is particularly pointed out and distinctly claimed in the concluding portion of this specification. My invention, however, both as to organization and method of operation, together with further objects and advantages thereof, may be best understood by reference to the following description taken in conjunction with the accompanying drawing.

In the drawing,

FIGURE 1 is a perspective view of a clothes dryer including my new and improved control arrangement, the view being partially broken away and partially in section to illustrate details of construction; and FIGURE 2 is a schematic diagram of a control system embodying my invention in one form thereof.

Referring now to FIGURE 1, I have shown therein a clothes dryer 1 which is illustrative of the various appliances in which my new and improved control system may be used. Dryer 1 includes a rotatable drum or basket 2 which is mounted for rotation about a generally horizontal axis. Basket 2 is disposed within an outer enclosing cabinet structure 3, and aligned openings 4 and 5 are provided respectively in the front walls of the basket and the cabinet structure for the loading and unloading of clothes from the basket. The openings 4 and 5 are flanged as shown to prevent clothes from dropping down between the basket and the cabinet. A door 6 hingedly mounted on the cabinet closes the opening 5 during the operation of the machine and operates a switch 6a to ensure that there will be no rotation of the basket 2 when the door is open.

For rotating the drum or basket 2 during the operation of the dryer, there is provided an electric motor 7 which is connected to the basket by a suitable drive belt 8. The pulleys (not shown) mounting the belt are so arranged that the basket 2 is driven at a suitable speed for tumbling articles of clothing therein. The basket 2 preferably includes upstanding ribs (not shown) on the inner surface thereof to aid in producing the tumbling action. Besides driving basket 2, motor 7 also serves to drive air moving means for circulating a stream of air through the basket during the operation of the dryer. The air moving means comprises a centrifugal blower 9 which is driven by motor 7 by means of a direct coupling 10. Blower 9 draws in air from the surrounding room through a conduit 11 which leads from a screened air inlet opening 12 in the toe board 13 of the cabinet.

The air drawn in by the blower 9 is discharged through an opening 14 at the top thereof into a passage 15 which is separated from the rotating basket by a baffle 16. As shown, the baffle 16 extends upwardly from the base of the machine to a point in the general vicinity of an electric heating element 17 mounted at the top of the machine, the baffle 16 being curved arcuately around the perforated side wall 18 of the drum for a portion of its length. The air discharged from the blower 9 flows upwardly through the passage 15 and passes outwardly therefrom across the electrical heating element 17. The air, still under pressure from the blower, flows downwardly through the perforated cylindrical wall 18 of the basket. The air then moves through the basket and the articles of clothing being tumbled therein and next passes into a collecting chamber 19 lying beneath the basket 2 on the opposite side of the baffle 16 from the passage 15. From the chamber 19 the air is discharged out of the cabinet into the surrounding room through an appropriate lint trap structure 20 mounted in the toe board 13.

As will be described, during the use of the machine heater 17 is energized along with drive motor 7. This causes the air discharged from the passage 15 to absorb heat from the heater 17 as it passes thereover, and the heated air then extracts moisture from the clothes being tumbled in the drum as it passes through them.

Referring now to FIGURE 2 I have shown therein a control system for the dryer 1, this system embodying my invention in one form thereof. The dryer is energized across a three wire electrical system including supply conductors 21 and 22 and neutral conductor 23. Conventionally, a voltage of 220 volts is provided between conductors 21 and 22, and a voltage of 110 volts is provided between each of the conductors 21 and 22 and neutral conductor 23. The entire electrical system of the machine is under the control of the manually operable switch 24 in conductor 22. The switch 24 is manually operable by any suitable means provided in connection with dryer 1 such as, for instance, the control member 25 shown on the backsplasher portion 26 of the machine (FIGURE 1).

Connected between conductor 22 and neutral 23, that is, across the source of 110 volt power, is a timer motor 27 which controls cams 28, 29 and 30, rotating the cams at a slow rate so that the cams control switches 31, 32 and 33 respectively to provide a full operative drying cycle. Switch 31 controls the operation of the heater 17, the heater being energized when the switches 24 and 31 are closed. The initial closing of the cam operated switches 31, 32 and 33 may, incidentally, also be incorporated as a part of the result of operating the control member 25. The switch 33 controls the energization of the timer motor 27, the timer motor being operative when switch 33 closes to connect it across the 110 volt source of power.

Conductor 23, which may include switch 6a as shown, is connected to the junction of the run winding 34 and the start winding 35 of motor 7. It will be understood that the motor 7 is, preferably, a conventional low-impedance induction-type motor having a main or run winding 34 which is in the circuit continuously when the motor is running and a start winding 35 of the type which is energized briefly at the beginning of an operation to effect starting of the motor and is then de-energized as the motor comes up to speed so that the motor then runs on winding 34 alone. Windings 34 and 35 are connected to conductor 22 through a running circuit 36 and either a high-impedance control device such as solenoid 37 or a short circuit 38 across the solenoid 37. The circuit 36 is normally open by virtue of the fact that a manually operable switch 39 is provided and is biased to open position by a suitable spring 40 so that the circuit 36 is completed only when switch 39 is manually depressed. It will be observed, referring again to FIGURE 1, that switch 39 may preferably be located in a suitable position on the backsplasher 26 as shown.

The short circuit 38 across the solenoid member 37 includes timer switch 32. Thus, when cam 29 closes switch 32, the solenoid is de-energized by virtue of the short circuit across it, and when the switch 32 is open it is possible for the solenoid to be energized since there is no longer a short circuit across it.

In order to effect disconnection of start winding 35 as the motor comes up to speed, a suitable speed-responsive switch mechanism 41 is provided which is engageable either with a contact 42 when the motor rotates below a predetermined speed or a contact 43 when the predetermined speed is reached. Thus, during starting when the motor is stopped or has not yet reached the predetermined speed the start winding 35 is connected in parallel with main winding 34 through contact 42 and switch arm 41. However, when the predetermined speed is reached the switch arm 41 moves over into engagement with contact 43. This then completes a running bypass circuit 44 which includes the switch arm 41 and which, as can be seen, effectively bypasses the start circuit 36.

In the relatively simple type of dryer control arrangement shown, it is contemplated that cams 28, 29 and 30 close switches 31, 32 and 33 substantially throughout an operation, with the timer motor 27 causing the cams to open the three switches when the operation is terminated. The closing of switch 24 and of switches 31, 32 and 33 thus starts the operation of the machine: heater 17 is energized because of the closure of switch 31; timer motor 27 is energized because of the closure of switch 33; and when the pushbutton 39 is depressed, the motor 7 is energized from conductor 23 through the windings of the motor in parallel, then through circuits 36 and 38 back to conductor 22. Thus, the motor comes up to speed as a result of its energization, and the speed-responsive member 41 switches over to complete bypass circuit 44 so that the circuit is then completed around the manually operable switch 39 which may be released, the motor continuing in operation as a result of the completion of the bypass circuit. Operation of the heater, the timer motor, and the main driving motor continues as long as the switches are closed.

When the end of an operation is reached it is frequently desirable that an audible signal be provided so that the operator of the machine will be advised of the termination of the cycle and may remove the clothes from the dryer promptly. This has various advantages, one of them being that certain types of clothing, if allowed to remain in a heap in the basket 2 after it has stopped tumbling, will acquire wrinkles which may make ironing more difficult or require ironing where none would otherwise be needed. For this reason, my invention contemplates the provision of improved means for sounding a bell device 45 at the termination of the cycle of operation. When the cycle is ended, timer motor 27 opens the switches 31, 32 and 33. It will readily be observed that the opening of switch 31 terminates energization of the heater 17 and that opening of switch 33 terminates operation of the timer motor. In addition, the opening of switch 32 removes the short circuit from across solenoid member 37 and as a result the solenoid member is placed in series with the drive motor 7 through bypass circuit 44. Because the solenoid is a relatively high-impedance device (generally on the order of 500 ohms or higher), and the motor is a low-impedance device whose windings generally represent an impedance of 5 to 7 ohms, the placing of the solenoid in series with the motor removes substantially all voltage from across the motor, with the voltage appearing across the solenoid. The relatively high voltage across the solenoid causes energization thereof, with the result that the solenoid plunger 46 is pulled sharply upward to contact bell 45 and produce an audible signal to alert the operator to the end of the cycle.

The series relationship of the solenoid 37 and of winding 34 of motor 7, reducing the voltage across the motor to the point where there is virtually no energization of the motor, causes the motor to start to slow down to a stop. When the speed of the motor drops substantially below the predetermined speed at which the switch arm 41 had moved over into engagement with contact 43, the switch arm then moves back into engagement with contact 42 thereby opening the bypass circuit 44. Since, with the start circuit 36 open, the bypass circuit 44 constituted the only means of completing an energizing circuit for either the solenoid 37 or the motor 7, the opening of this bypass circuit thereupon de-energizes both the solenoid and the motor so that all parts of the machine 1 are de-energized.

It will be seen from the foregoing that the provision of an audible signal is provided by a solenoid and bell arrangement wherein the opening of a single timer control switch 32 effects, in sequence, the energization of the solenoid to give an audible signal and then the de-energization of both the solenoid and the motor. In this connection, it will be understood that the speed-responsive mechanism 41 and the manually operable switch 39 are, usually, conventional elements provided in machines regardless whether an audible signal is provided or not. On this point, reference is made to Patent 2,858,619, issued on November 4, 1958, to Philip G. Hughes, and assigned to the assignee of my present invention, which describes and claims a control arrangement of the type incorporating a speed-responsive motor switch and a manually operable switch; the Hughes arrangement is commercially used in the machines produced by the common assignee of Hughes and myself.

While in accordance with the patent statutes I have described what at present is considered to be the preferred embodiment of my invention, it will be obvious to those skilled in the art that various changes and modifications may be made therein without departing from the invention, and I therefore aim in the appended claim to cover all such changes and modifications as fall within the true spirit and scope of my invention.

What I claim as new and desire to secure by Letters Patent of the United States is:

A clothes dryer comprising: a rotatable basket; air moving means for circulating air through said basket;

electric heater means for heating air prior to its entry into said basket; an induction-type motor for rotating said basket and operating said air moving means, said motor including low-impedance start and run windings connected in parallel with each other and a speed-responsive switch mechanism having a first position below a predetermined speed and a second position above said predetermined speed; a sequence controller; first, second and third timer switches controlled by said sequence controller, said first timer switch being connected in series with said heater and controlling energization thereof, said second timer switch being connected in series with said sequence controller and controlling energization thereof; sound-producing means including a high-impedance coil connected in series with said motor, an armature member rapidly movable from a first toward a second position in response to brief energization of said coil, and stationary means positioned to be struck by said armature member during its movement from said first position to said second position whereby said sound-producing means is effective to provide a single audible signal when energized for a brief period by the striking of said stationary means by said armature member; a short circuit connected across said high-impedance means, said third timer switch being connected in said short circuit and controlling completion thereof; a starting circuit for said motor including a manually operable switch in series with both said windings and with both said high-impedance means and said short circuit, said manually operable switch being biased to an open position; and a bypass circuit around said manually operable switch including said speed-responsive mechanism, said speed-responsive mechanism opening said bypass circuit and completing connection of said start winding when in said first position thereof and completing said bypass circuit and disconnecting said start winding when in said second position thereof, whereby opening of said third timer switch during motor operation energizes said high-impedance means in series with said motor, and said motor as a result is de-energized opening said bypass circuit.

References Cited in the file of this patent
UNITED STATES PATENTS

| | | |
|---|---|---|
| 1,003,465 | Kennedy | Sept. 19, 1911 |
| 1,628,367 | Lake | May 10, 1927 |
| 2,021,239 | Lockett | Nov. 19, 1935 |
| 2,215,666 | Meitzler | Sept. 24, 1940 |
| 2,604,497 | Morrison | July 22, 1952 |
| 2,715,201 | Manecke | Aug. 9, 1955 |
| 2,882,610 | Hughes | Apr. 21, 1959 |